(12) United States Patent
Ulbricht et al.

(10) Patent No.: US 10,591,057 B2
(45) Date of Patent: Mar. 17, 2020

(54) CONTROL ARRANGEMENT FOR A TRANSMISSION BRAKE WITH A QUICK EXHAUST VALVE

(71) Applicant: ZF Friedrichshafen AG, Friedrichshafen (DE)

(72) Inventors: Markus Ulbricht, Tettnang (DE); Andreas Graf, Stockach (DE); Martin Rist, Oberteuringen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 63 days.

(21) Appl. No.: 15/840,566

(22) Filed: Dec. 13, 2017

(65) Prior Publication Data
US 2018/0172153 A1    Jun. 21, 2018

(30) Foreign Application Priority Data
Dec. 15, 2016 (DE) .................. 10 2016 225 075

(51) Int. Cl.
*F16H 63/30* (2006.01)
*B60T 1/06* (2006.01)
(Continued)

(52) U.S. Cl.
CPC .......... *F16H 63/3026* (2013.01); *B60T 1/062* (2013.01); *B60T 13/662* (2013.01);
(Continued)

(58) Field of Classification Search
CPC .......... F15B 11/006; F15B 2211/30575; F15B 2211/7052; B60T 1/062; F16D 55/40; F16H 63/3026
(Continued)

(56) References Cited

U.S. PATENT DOCUMENTS 3,608,581 A * 9/1971 Sweet ..................... F16K 17/00
137/509
4,874,068 A * 10/1989 Collins ................... F16D 67/04
192/18 A
(Continued)

FOREIGN PATENT DOCUMENTS

| DE | 10249341 A1 | 5/2004 |
|----|----|----|
| DE | 102010002764 A1 | 9/2011 |
| DE | 10 2013 016 759 A1 | 4/2015 |

OTHER PUBLICATIONS

German Search Report issued in corresponding German Patent Application No. 10 2016 225 075.2 dated Jan. 31, 2018.

*Primary Examiner* — Michael Leslie
(74) *Attorney, Agent, or Firm* — Davis & Bujold PLLC; Michael J. Bujold

(57) ABSTRACT

An assembly (12) for actuating a transmission brake (1) that has a transmission brake cylinder (7), at least one control valve (16, 17) for controlling pressurizing and/or exhausting of the transmission brake cylinder (7), and at least one pressure line (14) via which the at least one control valve (16, 17) is connected to the transmission brake cylinder (7) to supply a pressure medium (10) to and discharge the pressure medium (10) from a pressure chamber (9) of the transmission brake cylinder (7). The assembly (12) includes a quick-exhaust valve (15), which is arranged in the pressure line (14) between the transmission brake cylinder (7), and the at least one control valve (16, 17).

17 Claims, 3 Drawing Sheets

(51) Int. Cl.
    *B60T 17/00*    (2006.01)
    *B60T 13/66*    (2006.01)
    *F16D 55/40*    (2006.01)
    *B60T 13/68*    (2006.01)
    *F15B 13/02*    (2006.01)
    *F15B 15/14*    (2006.01)
    *F16K 7/17*     (2006.01)
    *F16K 11/22*    (2006.01)
    *F16D 121/04*   (2012.01)
    *F16D 121/16*   (2012.01)

(52) U.S. Cl.
    CPC ............ *B60T 13/686* (2013.01); *B60T 17/00* (2013.01); *F15B 13/027* (2013.01); *F15B 15/149* (2013.01); *F16D 55/40* (2013.01); *F16K 7/17* (2013.01); *F16K 11/22* (2013.01); *F15B 2211/428* (2013.01); *F15B 2211/7052* (2013.01); *F16D 2121/04* (2013.01); *F16D 2121/16* (2013.01)

(58) Field of Classification Search
    USPC ...................................... 91/452, 454; 60/435
    See application file for complete search history.

(56) References Cited

U.S. PATENT DOCUMENTS

| | | | | |
|---|---|---|---|---|
| 5,257,684 A * | 11/1993 | Collins | ................... | F16D 67/04 192/12 C |
| 5,313,873 A * | 5/1994 | Gall | .......................... | F15B 1/02 91/452 |
| 6,131,500 A * | 10/2000 | Moncrief | .................. | F15B 9/09 91/454 |
| 7,614,336 B2 * | 11/2009 | VerKuilen | ............. | F15B 11/006 91/446 |
| 8,240,444 B2 * | 8/2012 | Ulbricht | ............. | F16H 61/0021 192/221 |
| 8,718,882 B2 | 5/2014 | Gansohr | | |

\* cited by examiner

CONTROL ARRANGEMENT FOR A TRANSMISSION BRAKE WITH A QUICK EXHAUST VALVE

This application claims priority from German patent application serial no. 10 2016 225 075.2 filed Dec. 15, 2016.

FIELD OF THE INVENTION

This invention relates to an assembly for actuating a transmission brake and to a transmission brake having such an assembly

BACKGROUND OF THE INVENTION

Transmission brakes are used in shiftable transmissions, especially in those of commercial vehicles, in order to brake their countershafts so that shifting is faster and without double clutches. In vehicles with a clutch between the engine and the transmission, the actuation of the transmission brake can be effected in conjunction with the actuation (or disengaging) of a clutch. In doing so, a transmission brake cylinder is supplied with compressed air to make the transmission brake act.

The transmission brake is actuated automatically in automated manual transmissions. Automated actuation using compressed air and via corresponding shifting elements is effected for this purpose. Instead of pneumatic actuation, provision can also be made for hydraulic actuation. A piston is slidably held in the transmission brake cylinder and is reset, particularly by spring action, as soon as the fluid can escape from the transmission brake cylinder.

DE 10 2013 016 759 A1 discloses an assembly for actuating a transmission brake cylinder, particularly in conjunction with automated manual transmissions of commercial vehicles or buses, in which a transmission brake cylinder can be supplied with fluid from a brake line and in which a piston in the transmission brake cylinder can be reset by spring action. The assembly comprises two control valves, which can be used to control the pressure in the transmission brake cylinder and of which at least one is a power operated control valve. The two valves are arranged and configured such that fluid can escape from the transmission brake cylinder in the absence of power to the control valve. A disadvantage of this assembly lies in the fact that it only has weak exhausting dynamics. As a result the transmission brake cylinder cannot be exhausted fast enough in time-sensitive shifting situations.

SUMMARY OF THE INVENTION

The problem addressed by this invention is therefore that of creating an assembly for actuating a transmission brake that is distinguished by a high degree of control accuracy and short exhausting times.

The problem addressed by the invention is solved by the features of the independent claims. Further advantageous designs arise from the dependent claims and the drawings.

Proposed is an assembly for actuating a transmission brake of a motor vehicle having a transmission brake cylinder that can be pressurized, i.e., filled, and exhausted, i.e., discharged. The assembly additionally comprises at least one control valve for controlling this filling and/or exhausting the transmission brake cylinder. The assembly furthermore comprises at least one pressure line via which the at least one control valve is connected to the transmission brake cylinder. A pressure medium can thus be supplied to and discharged from a pressure chamber of the transmission brake cylinder via the pressure line.

The assembly comprises a quick-exhaust valve. It is arranged in the pressure line between the transmission brake cylinder and the at least one control valve. The transmission brake cylinder can be exhausted very quickly via the quick-exhaust valve. Because shifting times can be shortened as a result, this offers advantages, particularly in time-sensitive shifting situations.

It is advantageous if the quick-exhaust valve comprises a closure element that can be moved between a supply position and an exhaust position as a function of pressure on the valve side and a pressure on the brake cylinder side. In this regard it is particularly advantageous if the closure element is axially displaceable. In that way it can be ensured that the quick-exhaust valve is closed when supplying the transmission brake cylinder and open, at least within a time window, when exhausting the transmission brake cylinder in order to ensure a rapid emptying of the pressure chamber.

It is also advantageous if the closure element has in particular a rotationally symmetric base body. The latter is in particular configured in such a way that an exhaust orifice can be completely closed by means of this base body in the pressurizing position. The pressure medium can thus flow into the quick-exhaust valve via a valve orifice on the control valve side and flow out of the same via a cylinder orifice on the brake cylinder side. In addition or alternatively, it is advantageous if the base body is configured and/or arranged in such a way that the valve orifice on the control valve side can be at least partially closed by means of this base body in the quick-exhaust position. The pressure medium can thus flow into the quick-exhaust valve via the cylinder orifice and out of the same via the exhaust orifice.

In an advantageous further development of the invention, the closure element has a control element, in particular a control lip. The control element is preferably configured in such a way and/or arranged in such a way that a volume flow between the valve orifice and the cylinder orifice can be controlled by means of this element. In addition or alternatively, the control element is configured and/or arranged in such a way that the valve orifice on the control valve side can be partially closed. During the adjustment of the control pressure, it is thus possible to ensure by means of the control element that the closure element remains in its pressurizing position during minor pressure adjustments and that a volume flow through the quick-exhaust valve is only ensured via the bypass formed by the control element.

It is advantageous if the control element is configured elastically and/or radially displaceable. Movement of the control element and hence a change of the volume flow can thus be effected on the basis of the acting pressure.

It is advantageous if the control element can be moved between, in particular a radially inner opening position and, in particular a radially outer closure position. This movement can preferably be bending, pivoting, and/or tilting movement.

It is advantageous if the control element is elastically and/or flexibly pushed towards its closure position.

In an advantageous further development, the control element is arranged and/or configured in such a way that it can be moved towards its open position in the event of a pressure increase on the valve side and towards its closed position in the event of a pressure increase on the brake cylinder side. It is thus possible to ensure that the control element is moved into its open position in pressurizing the transmission brake cylinder and into its closure position when exhausting.

In this regard it is also advantageous if the control element has an in particular radially outer, first control surface on the valve side and an in particular radially inner, second control surface on the brake cylinder side. The control surfaces can thus be used to control movement of the control element into its open position and into its closure position.

It is furthermore advantageous if the closure element has a cavity that is formed, in particular at least partially, by the second control surface of the control element. When exhausting the transmission brake cylinder, a corresponding force can be exerted via the cavity on the second control surface so that the control element can be moved into its closure position. Moreover, the pressure medium is able to reach the exhaust orifice via the cavity.

By design, the control element can be configured in a simple manner if it is arranged on the outer periphery of the base body and/or extends slanted relative to an axial displacement axis.

It is also advantageous if the closure element is made of an elastic material, particularly a plastic, to ensure flexibility of the control element and furthermore a good sealing effect.

To be able to adjust the transmission brake with great accuracy, it is advantageous if the assembly comprises a pressure inlet side and/or timed inlet valve, in particular a 2/2-way NC control valve, and/or an outlet side outlet valve, in particular a 2/2-way NO control valve, "NC" means that the valve is 'normally closed' without power supply. "NO" means that the valve in question is 'normally open' without power supply. It is thus possible to ensure that in the absence of power, the transmission brake cylinder will be exhausted and not remain pressurized.

It is also advantageous if the pressure line has a line junction in which an inlet valve-side inlet portion, an outlet valve-side outlet portion, and a brake cylinder-side supply/discharge portion of the pressure line are merged. In this regard it is furthermore advantageous if the quick-exhaust valve is arranged in the supply/discharge portion.

It is advantageous if the assembly has a valve control system. The latter is preferably configured in such a way that for exhausting the transmission brake cylinder, the inlet valve and/or the outlet valve can be actuated by means of this control system in such a way that a first partial quantity of the pressure medium in the pressure chamber can be initially discharged via the outlet valve and a second portion that is larger relative to the first portion can then be discharged via the quick-exhaust valve. A very quick exhausting of the transmission brake cylinder can thus be ensured.

A transmission brake with an assembly for actuating the former is furthermore proposed. The assembly is configured according to the preceding description, wherein the aforementioned features may be present individually or in any combination. A transmission brake cylinder can thus be exhausted very quickly. This confers advantages, particularly in time-sensitive shifting situations, because shifting times can be shortened as a result.

BRIEF DESCRIPTION OF THE DRAWINGS

The invention is explained in more detail below with reference to drawings, wherein.

DETAILED DESCRIPTION OF THE PREFERRED EMBODIMENTS

Figure 1:
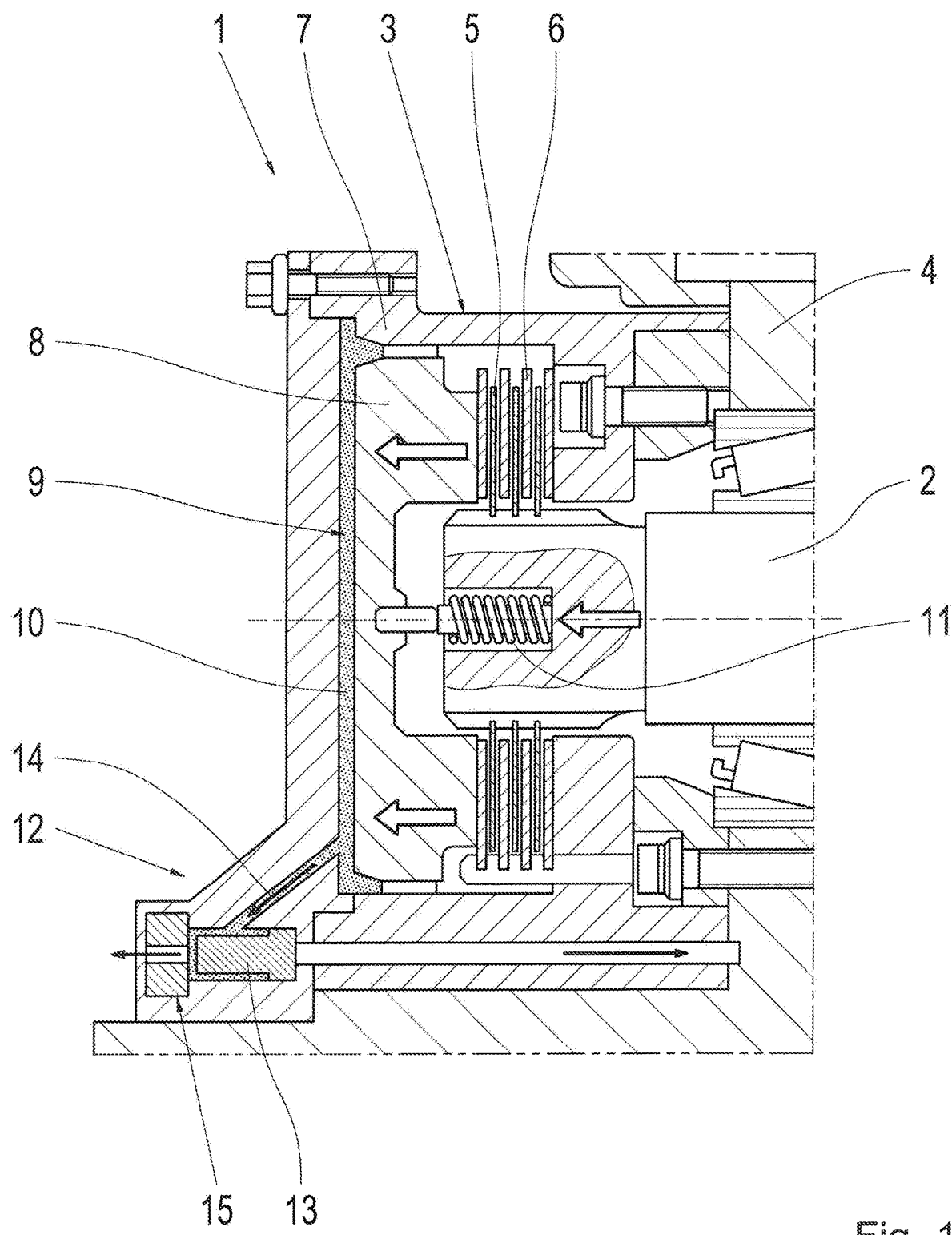
FIG. 1 shows a cross section through a transmission brake with a quick-exhaust valve.

FIG. 1 shows a transmission brake 1 of a manual transmission that is not depicted in any further detail here. The manual transmission is preferably a countershaft-type automated manual transmission having a dog clutch. Such transmission brakes 1 are preferably installed in utility vehicles or buses. The transmission brake 1 is configured as a hydraulically or pneumatically actuatable multiple disc brake.

According to this exemplary embodiment, the transmission brake 1 is arranged on the engine-side end of a countershaft 2 of the manual transmission not shown in any greater detail. The transmission brake 1 has a brake housing 3, which is connected to a transmission housing 4. As already mentioned above, the transmission brake 1 according to this exemplary embodiment is configured as a multiple disc brake and accordingly has several inner discs 5 and outer discs 6. The inner and outer discs 5, 6 of the transmission brake 1 are alternatingly connected via inner and outer splines to the countershaft 2 and the brake housing 3 for conjoint rotation.

The transmission brake 1 has a transmission brake cylinder 7. In the present case it is at least partially formed by the transmission housing 4. An axially displaceable piston 8 is furthermore arranged in the interior of the transmission brake cylinder 7. A pressure chamber 9 is formed between the piston 8 and the transmission brake cylinder 7. The transmission brake 1 is actuated via the piston 8 arranged for axial displacement in the transmission brake cylinder 7 by introducing a pressure medium 10 into the pressure chamber 9 via an assembly 12 for controlling the transmission brake 1, which assembly shall be described in detail below. As a result the piston 8 is pushed against the discs 5, 6, against the reset force of a spring 11 arranged between the piston 8 and the countershaft 2. As a result the countershaft 2 is decelerated in order to synchronize the manual transmission. To release the transmission brake 1, the pressure chamber 9 or rather the transmission brake cylinder 7 is exhausted again, making the spring 11 push the piston 8 back again.

According to the exemplary embodiment shown in FIG. 1, the assembly 12 for actuating the transmission brake 1 comprises at least one control valve 13, by means of which the filling and/or exhausting of the transmission brake cylinder 7 can be controlled. In addition the assembly 12 comprises a pressure line 14 via which the at least one control valve 13 is connected to the transmission brake cylinder 7.

According to FIG. 1, the assembly 12 comprises a quick-exhaust valve 15. It is arranged in the pressure line 14 between the transmission brake cylinder 7 and the at least one control valve 13. Increased piston speeds in reverse are achievable as a result because the pressure medium in the pressure chamber 9 can be discharged very quickly via the quick-exhaust valve 15 when exhausting the transmission brake cylinder 7. According to the exemplary embodiment depicted in FIG. 1, the quick-exhaust valve 15 vents to a clutch housing.

Figure 2:
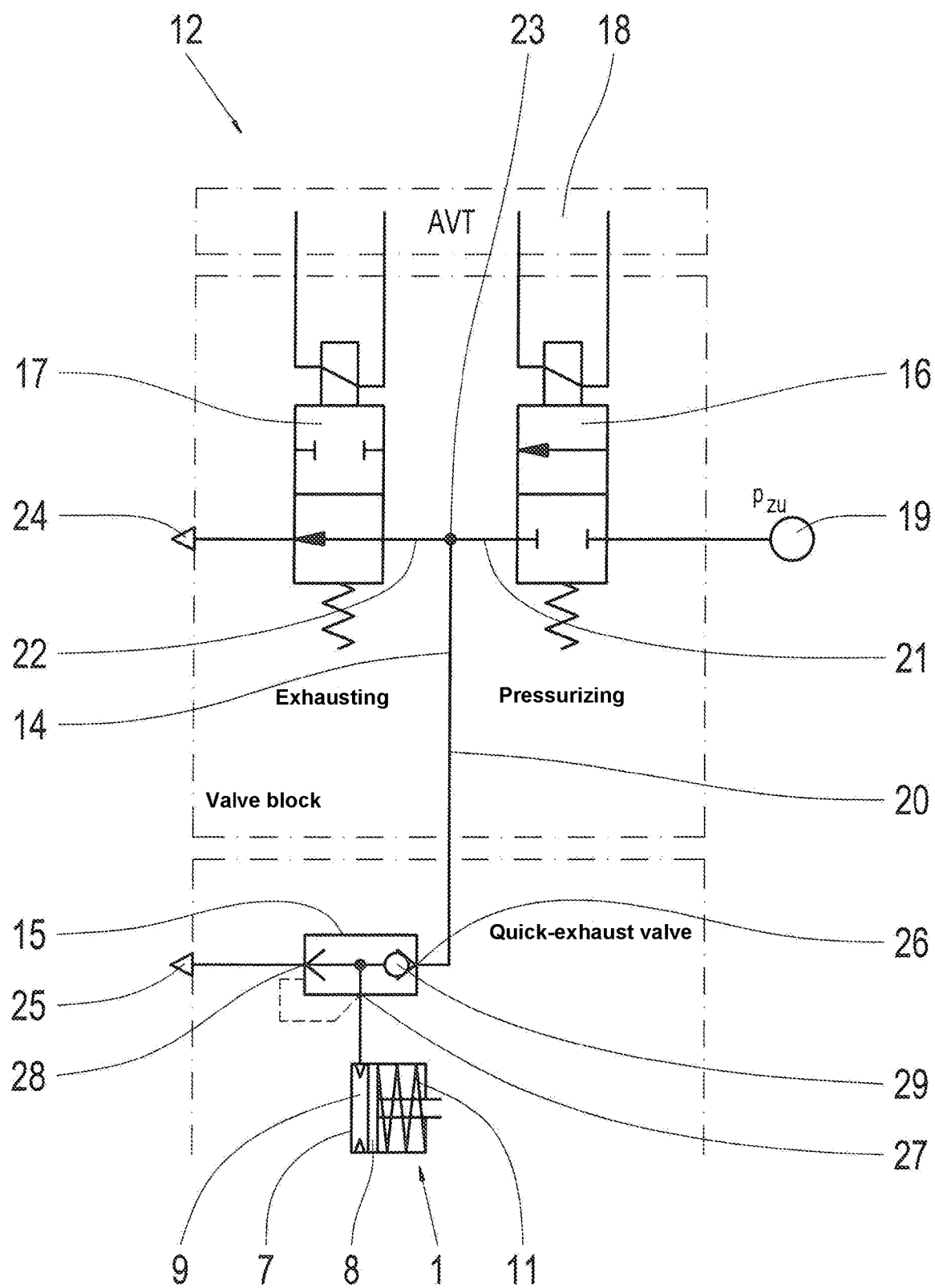
FIG. 2 shows a schematic block diagram of an assembly for controlling the transmission brake depicted in FIG. 1

FIG. 2 shows a schematic diagram of the assembly 12 for controlling the transmission brake 1 depicted in FIG. 1. The assembly 12 in this case comprises two control valves 13, namely an inlet valve 16 and an outlet valve 17. The assembly 12 additionally comprises a valve control system 18 by means of which the inlet valve 16 and the outlet valve 17 can be actuated electrically. The inlet valve 16 is configured as a 2/2-way NC control valve. In this case "NC" means that the inlet valve 16 is 'normally closed' without power supply and therefore shuts off the associated line portion. According to this exemplary embodiment, the outlet valve 17 is configured as a 2/2-way NO control valve. "NO" means that the outlet valve 17 in question is 'normally open' without power supply and therefore does not shut off the associated line portion. In an advantageous fashion the pressure medium 10 can thus escape from the pressure chamber 9 in case of a loss of electric power. As a result the transmission brake 1 can be prevented from remaining closed in the event of a power failure.

The inlet valve 16 and the outlet valve 17 are connected via the pressure line 14 to the transmission brake cylinder 7 and/or to the pressure chamber 9. The quick-exhaust valve 15 is arranged between the transmission brake cylinder 7 and the inlet valve 16. Accordingly, the quick-exhaust valve 15 is situated in a pressurizing path of the assembly 12 so that the pressure medium 10 for filling the transmission brake cylinder 7 enters the transmission brake cylinder 7 from a pressure source 19 via the inlet valve 16 and the quick-exhaust valve 15.

The quick-exhaust valve 15 is in addition arranged between the transmission brake cylinder 7 and the outlet valve 17. Consequently, the quick-exhaust valve 15 is also situated in an exhaust path, i.e. when exhausting the transmission brake cylinder 7, at least part of the pressure medium 10 in the pressure chamber 9 can be discharged via the quick-exhaust valve 15 and the outlet valve 17.

According to this exemplary embodiment, the pressure line 14 comprises a supply/discharge portion 20, which extends from the transmission brake cylinder 7 towards both valves 16, 17. The quick-exhaust valve 15 is arranged in the supply/discharge portion 20. In addition, the pressure line 14 comprises an inlet portion 21, which extends starting from the inlet valve 16 towards the transmission brake cylinder 7 and is connected to the supply/discharge portion 20. The pressure line 14 furthermore has an outlet portion 22, which extends from the outlet valve 17 towards the transmission brake cylinder 7 and is likewise connected to the supply/discharge portion 20. The connection of the inlet portion 21 and the outlet portion 22 to the supply/discharge portion 20 is established in a joint line junction 23.

For pressurizing the transmission brake cylinder 7, the outlet valve 17 is closed by the valve control system 18 and the inlet valve 16 is opened. As a result the pressure medium 10 can flow out of the pressure source 19 and via the inlet valve 16 into the inlet portion 21 and from there into the supply/discharge portion 20, particularly into a first part. The pressure medium 10 then flows through the quick-exhaust valve 15 and enters the transmission brake cylinder 7 via a second part of the supply/discharge portion 20. The inlet valve 16 is preferably configured as a time-controlled valve. Accordingly, it is cyclically actuated by the valve control system 18 in order to adjust the braking power of the transmission brake 1.

For exhausting the transmission brake cylinder 7, the inlet valve 16 is closed and the outlet valve 17 is opened. A first partial quantity 24 of the pressure medium 10 in the pressure chamber 9 can thus be discharged via the supply/discharge portion 20 and the outlet portion 22 via the outlet valve 17. On the other hand, a second partial quantity 25 of the pressure medium 10 in the pressure chamber 9 that is larger relative to the first partial quantity 24 is discharged via the quick-exhaust valve 15 upstream.

Figure 3:
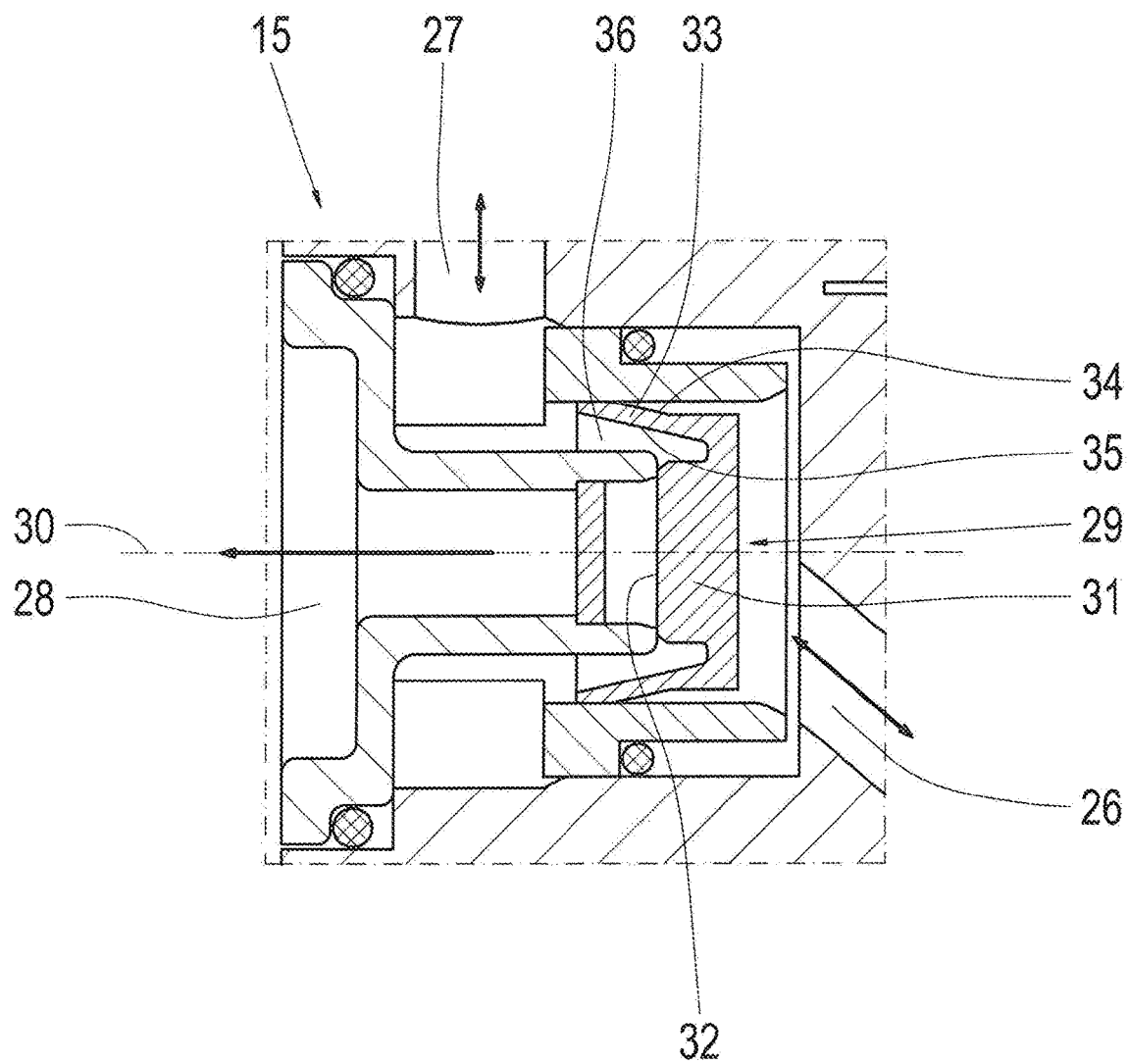
FIG. 3 shows a close-up view of the quick-exhaust valve of the transmission brake depicted in FIG. 1.

The exact functioning and design of the quick-exhaust valve 15 will be described in more detail below, with reference to the exemplary embodiment depicted in FIG. 3. FIG. 3 shows a close-up sectional view of the quick-exhaust valve 15. The quick-exhaust valve 15 has a valve orifice 26 on the control valve side and a cylinder orifice 27 on the brake cylinder side. Accordingly, the valve orifice 26 is connected to the valve-side part of the supply/discharge portion 20 and the cylinder orifice 27 is connected to the transmission brake cylinder-side part of the supply/discharge portion 20. In addition the quick-exhaust valve 15 comprises an exhaust orifice 28 via which the second partial quantity 25 can be discharged upon exhausting the transmission brake cylinder 7.

The quick-exhaust valve 15 has a closure element 29. The closure element 29 is moveable, in particular axially displaceable along a displacement axis 30, between the pressurizing position depicted in FIG. 3 and a quick-exhaust position as a function of a pressure on the valve side and on the brake cylinder side.

According to FIG. 3, the closure element 29 has a base body 31, which is essentially configured to be rotationally symmetric. On its end face the base body 31 has a sealing surface 32, with which the exhaust orifice 28 is closed in the pressurizing position of the closure element 29. In the pressurizing position, the pressure medium 10 can flow via the valve orifice 26 into the quick-exhaust valve 15 and then flow out of the same via the cylinder orifice 27.

A control element 33 is arranged in the flow path formed between the valve orifice 26 and the cylinder orifice 27. The control element 33 is part of the closure element 29. According to the exemplary embodiment depicted in FIG. 3, the control element 33 is a control lip by means of which a volume flow between the valve orifice 26 and the cylinder office 27 can be controlled. In addition, the valve orifice 26 can be completely closed via the control lip in coaction with the base body 31.

The control element 33 is configured as elastic and/or flexible. By virtue of this elasticity and/or flexibility, the control element can be moved between the radially outer closure position depicted in FIG. 3 and a radially inner opening position. The anchoring point is preferably formed in a connecting zone between the control element 33 and the base body 31 of the closure element 29.

The control element 33 or rather the control lip is preferably elastically pushed radially outwards into the closure position depicted in FIG. 3. Accordingly, when pressurizing the transmission brake cylinder 7, the closure element 29 is pushed by the pressure medium 10 flowing in via the valve orifice 26 into its pressurizing position depicted here so that the exhaust opening 28 is completely closed by the sealing surface 32. In addition, the control element 33, in particular the control lip, is pushed radially inwards via the increasing pressure on the valve orifice side from its closure position depicted in FIG. 3 towards its opening position. As a result the pressure medium 10 can flow towards the cylinder orifice 27 through a gap formed between the closure element 29 and the housing part of the quick-exhaust valve 15.

For controlling the movement of the control element 33, the latter has a radially outer first control surface 34 and a radially inner second control surface 35. The first control surface 34 in this case is arranged on the valve side and the second control surface 35 is arranged on the brake cylinder side. Accordingly, the pressure on the valve side is applied to the first control surface 34 of the control element 33 and the pressure is applied to the cylinder orifice side is on the second control surface 35. The closure element additionally comprises a cavity 36, which is at least partially delimited by the second control surface 35. The pressure medium 10 can flow via this cavity from the cylinder orifice 27 to the exhaust orifice 28.

For exhausting the transmission brake cylinder 7, initially the first partial quantity 24 reaches the valve orifice 26 via the gap formed between the control element 33 in its opening position and the radially outer housing of the quick-exhaust valve 15. From there the pressure medium 10 flows to the outlet valve 17 (for comparison see FIG. 2).

As soon as the pressure on the cylinder orifice side is greater than the pressure on the valve orifice side, the control element 33 is pushed out of its radially inner opening position into its radially outer closure position, thereby closing the gap. As a result the valve orifice 26 is now closed by the base body 31 and the control element 33.

As a result of the increasing pressure on the cylinder orifice side and/or decreasing pressure on the valve orifice side, the closure element 29 moves out of its pressurizing position depicted in FIG. 3 towards the valve orifice 26 and into a quick-exhaust position. As a result the exhaust orifice 28 is unblocked so that the second partial quantity 25 can rapidly escape from the quick-exhaust valve 15. Owing to the short exhaust intervals, the shifting time of the transmission brake 1 can be shortened to be able to master time-sensitive shifting situations more effectively.

This invention is not limited to the exemplary embodiments depicted and described here. Modifications in the scope of the claims are possible, as is a combination of the features, even if they are depicted and described in different exemplary embodiments.

REFERENCE SIGNS

1 Transmission brake
2 Countershaft
3 Brake housing
4 Transmission housing
5 Inner discs
6 Outer discs
7 Transmission brake cylinder
8 Piston
9 Pressure chamber
10 Pressure medium
11 Spring
12 Assembly
13 Control valve
14 Pressure line
15 Quick-exhaust valve
16 Inlet valve
17 Outlet valve
18 Valve control system
19 Pressure source
20 Supply/discharge portion
21 Inlet portion
22 Outlet portion
23 Line junction
24 First partial quantity
25 Second partial quantity
26 Valve orifice
27 Cylinder orifice
28 Exhaust orifice
29 Closure element
30 Displacement axis
31 Base body
32 Sealing surface
33 Control element
34 First control surface
35 Second control surface
36 Cavity

The invention claimed is:

1. An assembly for actuating a transmission brake comprising:
   a transmission brake cylinder,
   at least one control valve for controlling at least one of pressurizing and exhausting of the transmission brake cylinder,
   at least one pressure line, via which the at least one control valve being connected to the transmission brake cylinder to supply and discharge a pressure medium to and from a pressure chamber, and
   the assembly having a quick-exhaust valve being arranged in the pressure line, between the transmission brake cylinder and the at least one control valve.

2. The assembly according to claim 1, wherein the quick-exhaust valve comprises a closure element which is axially displaceable, between a pressurizing position and a quick-exhaust position, as a function of a pressure on a valve side and on a brake cylinder side.

3. The assembly according to claim 2, wherein the closure element has a base body by which at least one of:
   an exhaust orifice of the quick-exhaust valve is completely closable in a pressurizing position, and
   a valve orifice, on the valve side, is at least partially closable in a quick-exhaust position.

4. The assembly according to claim 2, wherein the closure element has a control element which is at least one of elastic and radially displaceable, and by which at least one of:
   a volume flow between a valve orifice and a cylinder orifice is controlled, and
   the valve orifice, on the valve side, is partially closable.

5. The assembly according to claim 4, wherein the control element is movable between a radially inner opening position and a radially outer closure position, and the control element is elastically biased towards the closure position.

6. The assembly according to claim 4, wherein the control element is at least one of arranged and configured to be movable towards an opening position, in an event of an increase in pressure on the valve side, and towards a closure position, in an event of an increase in pressure on a brake cylinder side.

7. The assembly according to claim 4, wherein the control element has a radially outer first control surface, on the valve side, and a radially inner second control surface, on a brake cylinder side.

8. The assembly according to claim 2, wherein the closure element has a cavity that is at least partially formed by a second control surface of a control element.

9. The assembly according to claim 4, wherein the control element is at least one of arranged on an outer periphery of a base body and extends slanted to an axial displacement axis.

10. The assembly according to claim 2, wherein the closure element is made of an elastic material.

11. The assembly according to claim 1, further comprising at least one of a pressure source-side and a timeable inlet valve and an outlet-side outlet valve.

12. The assembly according to claim 1, wherein the pressure line has a line junction in which an inlet valve-side inlet portion, an outlet valve-side outlet portion, and a brake cylinder-side supply/discharge portion of the pressure line are joined together.

13. The assembly according to claim 2, wherein the quick-exhaust valve is arranged in the supply/discharge portion.

14. The assembly according to claim 11, wherein the assembly has a valve control system, which can be used to actuate the inlet valve and/or the outlet valve for exhausting the transmission brake cylinder in such a way that initially a first partial quantity of the pressure medium in the pressure chamber is discharged, via the outlet valve, and then a partial quantity, that is larger relative to the first partial quantity, is discharged via the quick-exhaust valve.

15. The assembly according to claim 11, wherein the inlet valve is a 2/2-way normally closed control valve, and the outlet-side outlet valve is a 2/2-way normally open control valve.

16. A transmission brake having a control assembly for actuating a transmission brake, the assembly comprising:
    a transmission brake cylinder,
    at least one control valve for controlling at least one of pressurizing and exhausting of the transmission brake cylinder,
    at least one pressure line via which the at least one control valve is connected to the transmission brake cylinder to supply and discharge a pressure medium to and from a pressure chamber, and
    the assembly having a quick-exhaust valve being arranged in the pressure line between the transmission brake cylinder and the at least one control valve.

17. An assembly for actuating a transmission brake having a transmission brake cylinder, the assembly comprising:
    at least one control valve being connected, via a pressure line, to the transmission brake cylinder for controlling a flow of pressure medium to and from the transmission brake cylinder for engaging and disengaging the transmission brake;
    a quick-exhaust valve being arranged in the pressure line, between the transmission brake cylinder and the at least one control valve, and the quick-exhaust valve having valve orifice located on a valve side of the quick-exhaust valve and which is connected, via the pressure line, to the at least one control valve, and a cylinder orifice located on a brake cylinder side of the quick-exhaust valve and which is connected, via the pressure line, to the transmission brake cylinder;
    the quick-exhaust valve having a housing part that forms a passage which extends along a displacement axis between the valve side and the brake cylinder side thereof, the quick-exhaust valve having a closure element located within the passage and being entirely axially movable along the displacement axis in a first direction within the quick-exhaust valve to a pressurizing position and in an opposite second direction to a quick-exhaust position as a function of a pressure on the valve side of the quick-exhaust valve and a pressure on the brake cylinder side of the quick-exhaust valve; and
    the closure element having a radially extending base body and an axially extending annular control element, a first axial end of the control element being connected to periphery of the base body and radially spaced from the housing part by a gap, the control element extending axially at an angle to the displacement axis such that an opposite second axial end of the control element contacts the housing part, the control element being movable between a radial opening position and a radial closing position as a function of the pressure on the valve side and the brake cylinder side, and the base body completely closes, in the pressurizing position of the closure element, the exhaust orifice of the quick-exhaust valve, and the base body, in the quick-exhaust position of the closure element, at least partially closes the valve orifice on the valve side of the quick-exhaust valve.

* * * * *